United States Patent
Ali et al.

(10) Patent No.: US 10,311,599 B2
(45) Date of Patent: Jun. 4, 2019

(54) SYSTEM AND METHOD FOR DIAGNOSIS OF LIGHTING SYSTEM

(71) Applicant: Caterpillar Inc., Peoria, IL (US)

(72) Inventors: Hassan Ali, Peoria, IL (US); Jacob Charles Maley, Germantown Hills, IL (US)

(73) Assignee: Caterpillar Inc., Deerfield, IL (US)

( * ) Notice: Subject to any disclaimer, the term of this patent is extended or adjusted under 35 U.S.C. 154(b) by 285 days.

(21) Appl. No.: 15/342,459

(22) Filed: Nov. 3, 2016

(65) Prior Publication Data
US 2018/0121743 A1 May 3, 2018

(51) Int. Cl.
| | |
|---|---|
| G06K 9/00 | (2006.01) |
| G06T 7/73 | (2017.01) |
| H05B 37/03 | (2006.01) |
| G06T 7/00 | (2017.01) |

(52) U.S. Cl.
CPC ............ *G06T 7/74* (2017.01); *G06K 9/00791* (2013.01); *G06T 7/0004* (2013.01); *H05B 37/03* (2013.01); *G06T 2207/20021* (2013.01); *G06T 2207/30168* (2013.01); *G06T 2207/30252* (2013.01)

(58) Field of Classification Search
CPC ...................... G06T 7/74; G06T 7/0004; G06T 2207/30168; G06T 2207/20021; G06T 2207/30252; G06K 9/00791; H05B 37/03
See application file for complete search history.

(56) References Cited

U.S. PATENT DOCUMENTS

| 7,512,252 | B2* | 3/2009 | Otsuka | B60Q 1/1423 382/104 |
|---|---|---|---|---|
| 8,412,418 | B2* | 4/2013 | Kumagai | E02F 3/7618 382/154 |
| 2005/0111761 | A1* | 5/2005 | Mathew | G06T 7/0012 382/305 |
| 2011/0134280 | A1* | 6/2011 | Chou | H04N 5/2351 348/234 |
| 2012/0045090 | A1* | 2/2012 | Bobbitt | G06K 9/00771 382/103 |
| 2013/0083978 | A1* | 4/2013 | Frederick | G16H 50/70 382/128 |
| 2014/0119651 | A1* | 5/2014 | Meyers | G06T 5/007 382/167 |

(Continued)

FOREIGN PATENT DOCUMENTS

| JP | 2008202331 | 9/2008 |
|---|---|---|
| JP | 2010204957 | 9/2010 |
| JP | 2014091973 | 5/2014 |

*Primary Examiner* — Howard D Brown, Jr.

(57) ABSTRACT

A control system for a hybrid machine is provided. The control system includes a controller communicably coupled to an energy storage unit of the hybrid machine. The controller is configured to receive data from the energy storage unit. The controller is configured to evaluate a current storage charge state of the energy storage unit based on the received data. The controller is configured to receive historical data related to idle events associated with an engine of the hybrid machine. The controller is configured to receive data related to one or more machine operating parameters. The controller is configured to pre-emptively control at least one of an engine speed and an engine power based on the received data for at least one of shutting down the engine during an idle state and restarting the engine.

20 Claims, 3 Drawing Sheets

(56) References Cited

U.S. PATENT DOCUMENTS

| | | | |
|---|---|---|---|
| 2014/0250110 A1* | 9/2014 | Yang | G06F 16/9535 |
| | | | 707/723 |
| 2014/0362282 A1* | 12/2014 | Romanenko | H04N 5/2355 |
| | | | 348/362 |
| 2015/0077281 A1* | 3/2015 | Taniguchi | B60R 1/00 |
| | | | 342/27 |

* cited by examiner

SYSTEM AND METHOD FOR DIAGNOSIS OF LIGHTING SYSTEM

TECHNICAL FIELD

The present disclosure relates generally to diagnostic system, and more particularly, to a system and method for diagnosis of a lighting system of a machine.

BACKGROUND

Machines, for example mining trucks, include lights that are present at different locations on the machine. Further, image capturing devices such as cameras are positioned at multiple locations on the machine. These image capturing devices may be utilized to provide feed associated with the machine and surroundings of the machine to assist in autonomous or semi-autonomous operation of the machine. Sometimes, such image capturing devices may not be equipped with night vision capabilities and may rely upon light generated by the lights of the machine to obtain clear and comprehensible images of the surroundings of the machine at night.

However, sometimes dark areas may be formed at locations surrounding the machine due to insufficient light received by such areas from the lights of the machine. Such dark areas may be formed for example, when the light may not be working properly, an intensity of the light may insufficient in providing the light required, the light may move from its fixed location due to impact with an external object, and so on. These dark areas may greatly impact a quality of the feed captured by the image capturing device, in turn affecting an operator who may rely on the clarity of the feed for easy operation of the machine.

U.S. Published Application Number 2015/0077281 describes a dump truck. The dump truck includes a vehicle body portion that includes an upper deck on which a cab is disposed and a frame which is disposed in a longitudinal direction, a vessel that is disposed above the frame, and a sixth imaging device that is disposed below the vessel at a rear end of the frame and can image the rear side of the vehicle body portion. The sixth imaging device is a wide dynamic range camera.

SUMMARY OF THE DISCLOSURE

In one aspect of the present disclosure, a diagnostic system for a lighting system of a machine is provided. The diagnostic system includes an image capturing device configured to generate an image feed of light cast by the lighting system. The diagnostic system includes a controller communicably coupled to the image capturing device. The controller is configured to receive the image feed of the light cast by the lighting system from the image capturing device. The controller is configured to analyze the image feed to detect if dark pixels are present in the image feed. The controller is configured to determine if a number of the dark pixels within a predefined area exceeds a predetermined threshold based on the detection. The controller is configured to provide an alert if the number of the dark pixels exceeds the predetermined threshold.

In another aspect of the present disclosure, a diagnostic method associated with a lighting system of a machine is provided. The method includes receiving, by a controller, an image feed of light cast by the lighting system from an image capturing device. The method includes analyzing, by the controller, the image feed to detect if dark pixels are present in the image feed. The method includes determining, by the controller, if a number of the dark pixels within a predefined area exceeds a predetermined threshold based on the detection. The method includes providing, by the controller, an alert if the number of the dark pixels exceeds the predetermined threshold.

In yet another aspect of the present disclosure, a machine is provided. The machine includes an engine, a frame, and a lighting system associated with the machine. The machine also includes an image capturing device configured to generate an image feed of light cast by the lighting system. The machine includes a controller communicably coupled to the image capturing device. The controller is configured to receive the image feed of the light cast by the lighting system from the image capturing device. The controller is configured to analyze the image feed to detect if dark pixels are present in the image feed. The controller is configured to determine if a number of the dark pixels within a predefined area exceeds a predetermined threshold based on the detection. The controller is configured to provide an alert if the number of the dark pixels exceeds the predetermined threshold.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
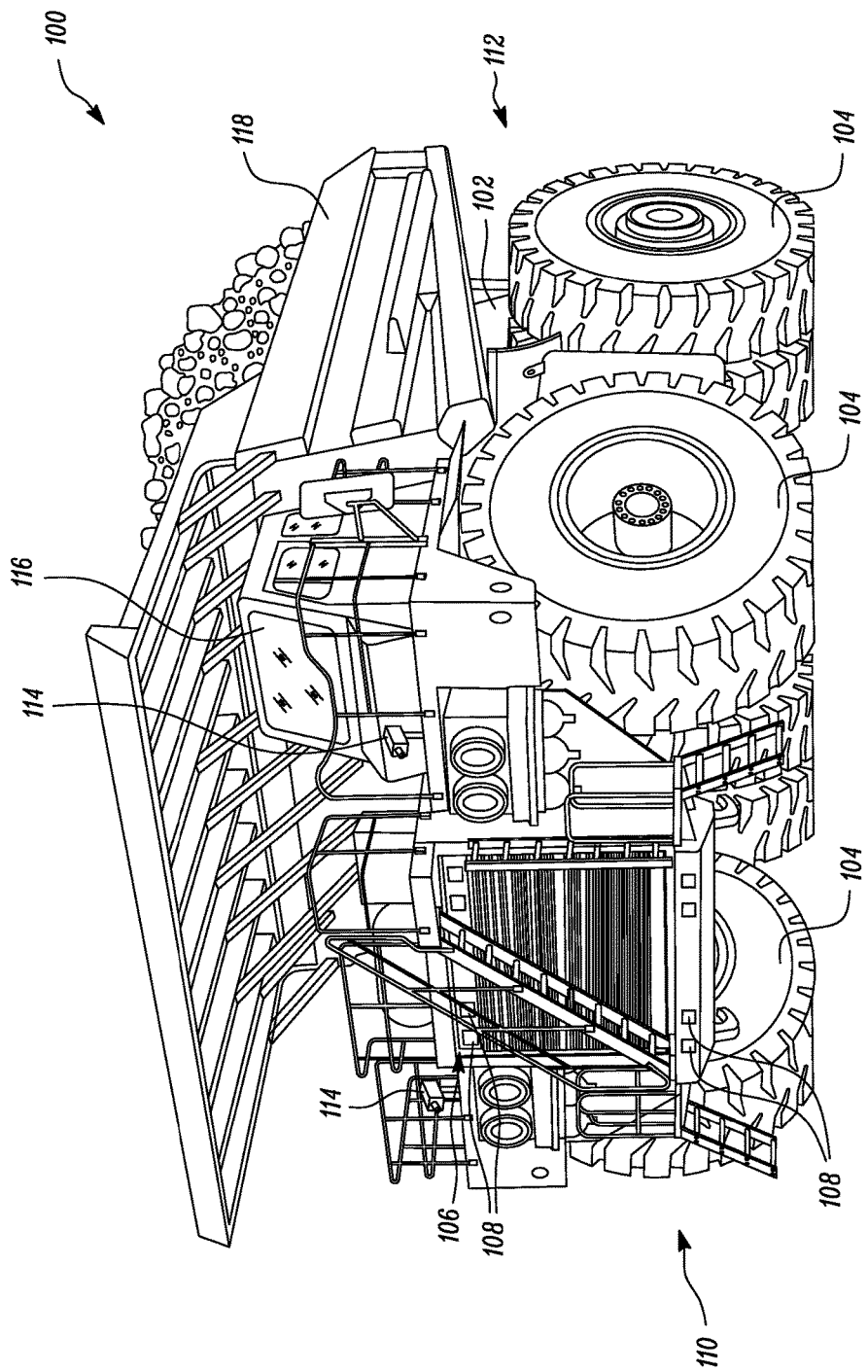
FIG. 1 is perspective view of an exemplary machine, according to one embodiment of the present disclosure.

Referring to FIG. 1, an exemplary machine 100 is illustrated. The machine 100 is a mining truck. Alternatively, the machine 100 may be any other machine such as a wheel loader, a motor grader, a scraper, an off-highway or on-highway truck, a hydraulic shovel, an excavator, an articulated truck, and so on.

The machine 100 generally includes a frame 102 for supporting, among other systems and components, an engine system and a fuel system. The machine 100 also includes a plurality of ground-engaging elements 104 that are embodied as wheels. An engine (not shown), for example an internal combustion engine, of the machine 100 provides propulsion power for the ground-engaging elements 104 and powers a variety of other machine systems, including various mechanical, electrical, and hydraulic systems and/or components.

The machine 100 includes a lighting system 106. The lighting system 106 includes a number of light sources, hereinafter referred to as lights 108, which are placed at different locations on the machine 100. For example, the lights 108 are present at a front portion 110 of the machine 100. The lights 108 are attached to the frame 102 of the machine 100. In the illustrated embodiment eight lights 108 are shown at the front portion 110 of the machine 100. Additionally or optionally, the lights 108 may be present at a rear portion 112 of the machine 100. Further, the lights 108 may be present at other locations on the machine 100. The number and location of the lights 108 may vary based on requirements and is not limited to that described herein. The lights 108 of the lighting system 106 are configured to cast light on a ground surface or any suitable area based on a coverage area of the respective light 108.

The machine 100 also includes a number of image capturing devices 114, for example, cameras, video capturing devices, camcorders, bird's eye view cameras, and so on that are placed at different locations on the machine 100. In the illustrated embodiment, two image capturing device 114 are positioned at the front portion 110 of the machine 100. The image capturing devices 114 are associated with respective lights 108 in such a manner that the image capturing devices 114 generate an image feed of the light cast by the lighting system 106. Accordingly, the image capturing devices 114 are appropriately aimed to allow the image capturing devices 114 to capture the image feed of the light cast by the lighting system 106 based on a field of view of the image capturing devices 114 and the location of the lights 108 such that there is minimum obstruction. A mounting location of the image capturing devices 114 and number of the image capturing devices 114 may vary. Further, the machine 100 includes an operator control station 116 having a variety of operator controls and displays useful for operating the machine 100 and/or a dump body 118 which is pivotal relative to the frame 102.

During operation, the engine distributes torque through a torque input shaft to a transmission system. The transmission system includes a torque output shaft drivably connected to the ground-engaging elements 104 through a differential and axle mechanism. Additionally, the machine 100 includes other systems and sub-systems that are not described herein for the purpose of simplicity.

Figure 2:
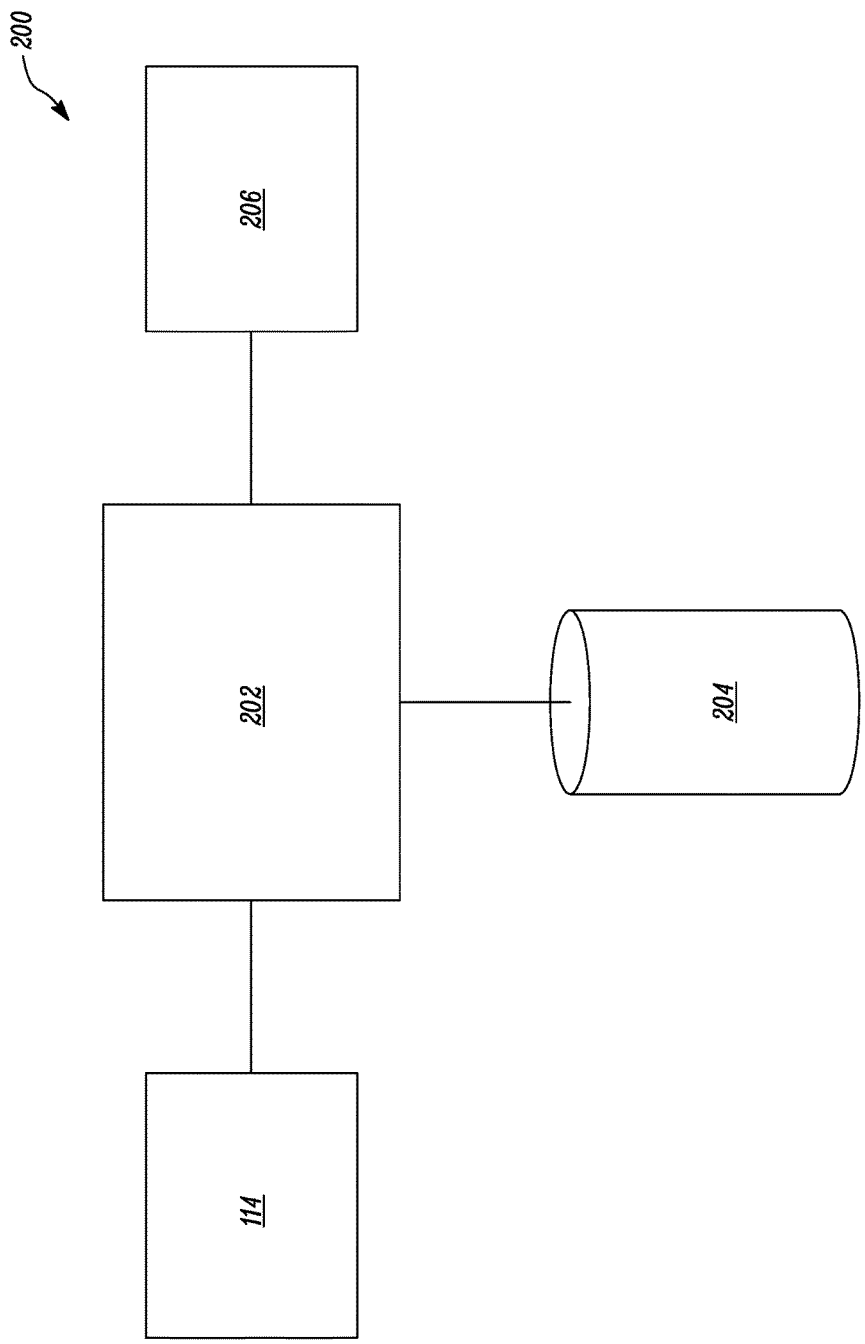
FIG. 2 is a block diagram of a diagnostic system associated with the machine of FIG. 1, according to one embodiment of the present disclosure.

The present disclosure relates to a diagnostic system 200 (see FIG. 2) associated with the lighting system 106 of the machine 100. Referring to FIG. 2, the diagnostic system 200 includes a controller 202 communicably coupled to the image capturing devices 114. The controller 202 receives the image feed of the light cast by the lighting system 106 from the image capturing devices 114. The controller 202 further analyzes the image feed on a pixel by pixel basis. More particularly, the controller 202 analyzes the image feed to determine if dark areas are present in the light cast by the lighting system 106. The identification of these dark areas made up of dark pixels in the image feed will now be explained in detail.

The controller 202 segments a frame of the image feed into a number of sections covering the entire frame. The controller 202 may then assess each of the sections of the frame of the image feed. The controller 202 iteratively scans each of the sections to determine if the dark pixels are present in the image feed. For determining if the dark pixels are present in the image feed, the controller 202 compares each pixel of the image feed with a predetermined value. If a light intensity of the given pixel is lesser than the predetermined value, the controller 202 detects the presence of the dark pixel in the image feed. Alternatively, if the light intensity of the given pixel is greater than the predetermined value, the given pixel is not considered to be the dark pixel.

The presence of the dark pixels may be indicative that the light received by the given pixel based on the light cast by the lighting system 106 is lesser than an expected value. It should be noted that the controller 202 makes use of machine learning algorithms to build a training dataset for the identification of the dark pixels. The algorithm factors in ambient light conditions to appropriately allow the system to function in daylight or night conditions. The controller 202 can accordingly determine if the dark pixels are formed due to low light ambient conditions and may reject such dark pixels. Further, the predetermined value for the identification of the dark pixels is so chosen that the controller 202 is able to distinguish between those dark pixels that are present in the image feed due to a dark object that is present in a portion of the field of view of the image capturing device 114 and the dark pixels formed by insufficient light cast by the lighting system 106. The light intensity of the dark pixels of the object are different from that of those formed by the reduced or no light cast by the lighting system 106, allowing the controller to reject the former dark pixels.

The controller 202 may be connected to a database 204. The database 204 may include any conventional data storage system, data repository, and/or internal or external data source. The database 204 may be present onboard the machine 100 or at a remote location. In one embodiment, the controller 202 may retrieve the pre-stored predetermined value from the database 204. Alternatively, the predetermined value may be stored and retrieved from a memory of the controller 202.

The controller 202 further determines the number of the dark pixels in a predefined area of the image feed. The controller 202 analyzes the image feed to determine if the detected dark pixels are proximate to one another in the image feed. Accordingly, the controller 202 determines if the number of the dark pixels in the predefined area exceeds a predetermined threshold. If the number of the dark pixels in the predefined area exceeds the predetermined threshold, it may be indicative that the dark area formed by the dark pixels exist in a given area of the image feed. Alternatively, if the number of the dark pixels do not exceed the predetermined threshold, the dark pixels may be scattered or not present in specific areas of the image feed. In one embodiment, the predetermined threshold may be stored and retrieved from the database 204. In another embodiment, the predetermined threshold may be stored in the memory of the controller 202.

Further, the controller 202 is connected to an output unit 206 such as a screen, a monitor, a speaker, or any other visual or auditory output unit. If the number of the dark pixels in the predefined area exceeds the predetermined threshold, the controller 202 provides an alert to an operator of the machine 100 via the output unit 206. For example, the controller 202 may command the output unit 206 to display a message indicating that the light cast by the lighting system 106 is insufficient. The light cast by the lighting system 106 may be insufficient due to a number of reasons, for example, the lights 108 may not be working properly, the lights 108 may not be switched on, a lens of the lights 108 may be dirty or the lights 108 may have moved from their fixed position. The controller 202 analyzes if the light cast in the predefined area of the image feed is as per the expected predetermined value and alerts the operator if the light casted by the lighting system 106 is lesser than this expectation.

In some embodiments, the controller 202 may further analyze the image to provide an indication of a particular light of the lighting system 106 associated with the dark pixels in the image feed. The controller 202 may correlate the presence the dark pixels in the image feed with the lights 108 of the lighting system 106. The controller 202 may correlate the location of the dark pixels in the image feed with a corresponding position of the lights 108 of the light system 106. Further, the controller 202 may also consider a position of the relevant image capturing device 114 that captures the light cast by the respective lights 108 of the lighting system 106. Accordingly, the controller 202 may determine a location of the light 108 associated with the dark pixels based on the correlation. For example, based on the identification of the presence of the dark pixels, the controller 202 may determine that the lights 108 located on a right side of the machine 100 are not producing sufficient light. The controller 202 may provide a command to the output unit 206 to provide a notification of the location of the corresponding light 108 based on the detection of the dark pixels. The notification may include, without any limitation, a text message, an auditory message or any other visual indication of the location of the corresponding light 108.

In some embodiments, the diagnostic system 200 may continuously run or operate in the background once the machine 100 is turned on. In other embodiments, the diagnostic system 200 may be manually activated by for example, a switch or a button present within the operator control station 116 of the machine 100.

The controller 202 may embody a single microprocessor or multiple microprocessors. Numerous commercially available microprocessors can be configured to perform the functions of the controller 202. The controller 202 may include all the components required to run an application such as, for example, a memory, a secondary storage device, and a processor, such as a central processing unit or any other means known in the art. Various other known circuits may be associated with the controller 202, including power supply circuitry, signal-conditioning circuitry, communication circuitry, and other appropriate circuitry.

INDUSTRIAL APPLICABILITY

Figure 3:
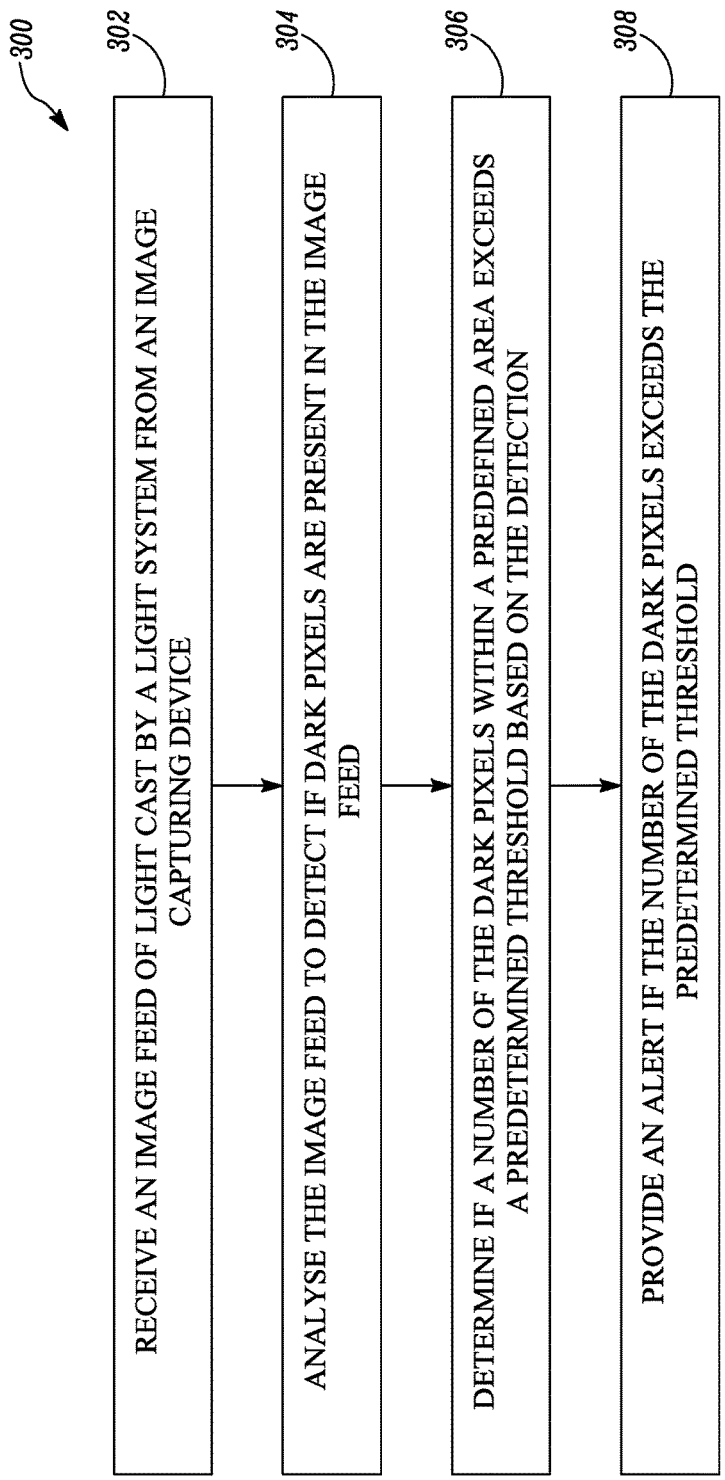
FIG. 3 is a flowchart of a method of operation of the diagnostic system of FIG. 2, according to one embodiment of the present disclosure.

The present disclosure relates to the diagnostic system 200 associated with the lighting system 106 of the machine 100. Referring to FIG. 3, a method 300 of operation of the diagnostic system is illustrated. At step 302, the controller 202 receives the image feed of light cast by the lighting system 106 from the image capturing device 114. At step 304, the controller 202 analyzes the image feed to detect if the dark pixels are present in the image feed. At step 306, the controller 202 determines if the number of the dark pixels within the predefined area exceeds the predetermined threshold. At step 308, the controller 202 provides the alert if the number of the dark pixels exceeds the predetermined threshold.

The diagnostic system 200 provides a simple and easy solution to alert the operator if the light cast by the lighting system 106 is insufficient, leading to the formation of the dark areas surrounding the machine 100. The controller 202 analyzes the image feed received from the image capturing device 114 to identify if the dark areas made up of dark pixels in the image feed exist, and on identification of such dark pixels alerts the operator. In some embodiments, the controller 202 may provide the notification indicating the location of the light 108 associated with formation of the dark pixels. Hence, the alert may cause the operator to take suitable corrective action to ensure that the intensity of the light in such identified dark pixels is increased. For example, the operator may replace the light 108, re-orient the light 108, clean the lens of the light 108, or install a new light with higher intensity, depending on requirements of the application.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A diagnostic system for a lighting system of a machine, the diagnostic system comprising:
    an image capturing device configured to generate an image feed of light cast by the lighting system; and
    a controller, communicably coupled to the image capturing device, configured to:
        receive, from the image capturing device, the image feed of the light cast by the lighting system;
        analyze the image feed to detect dark pixels that are present in the image feed,
            the dark pixels being formed by insufficient light cast by the lighting system;
        determine if a number of the dark pixels within an area satisfies a threshold based on detecting the dark pixels; and
        provide an alert if the number of the dark pixels satisfies the threshold.

2. The diagnostic system of claim 1,
    wherein the controller is communicably coupled to an output unit, and
    wherein the output unit is configured to generate the alert.

3. The diagnostic system of claim 1, wherein the controller is further configured to:
    segment the image feed into a plurality of sections, such that the controller is configured to analyze each of the plurality of sections.

4. The diagnostic system of claim 1, wherein the dark pixels are detected based on a comparison of each of a plurality of pixels, of the image feed, with a predetermined value.

5. The diagnostic system of claim 1, wherein a dark pixel, of the dark pixels, is detected if a light intensity of a corresponding pixel of the image feed, is less than a particular value.

6. The diagnostic system of claim 1, wherein the controller is further configured to correlate a position of the dark pixels with a corresponding light source of the lighting system.

7. The diagnostic system of claim 6, wherein the controller is further configured to identify a location of the corresponding light source based on correlating the position of the dark pixels with the corresponding light source.

8. The diagnostic system of claim 7, wherein the controller is further configured to provide a notification of the location of the corresponding light source.

9. The diagnostic system of claim 1, wherein the diagnostic system is activated manually.

10. A method associated with a lighting system of a machine, the method comprising:
    receiving, by a controller and from an image capturing device, an image feed of light cast by the lighting system;
    analyzing, by the controller, the image feed to detect dark pixels that are present in the image feed,
        the dark pixels being formed by insufficient light cast by the lighting system;

determining, by the controller, if a number of the dark pixels within an area satisfies a threshold based on detecting the dark pixels; and providing, by the controller, an alert if the number of the dark pixels satisfies the threshold.

11. The method of claim 10, further comprising:

segmenting, by the controller, the image feed into a plurality of sections for analyzing each of the plurality of sections of the image feed.

12. The method of claim 10, wherein the dark pixels are detected based on a comparison of each of a plurality of pixels, of the image feed, with a predetermined value.

13. The method of claim 10, wherein a dark pixel, of the dark pixels, is detected if a light intensity of a corresponding pixel, of the image feed, is less than a particular value.

14. The method of claim 10, further comprising:

correlating, by the controller, a position of the dark pixels in the image feed with a corresponding light source of the lighting system.

15. The method of claim 14, further comprising:

identifying, by the controller, a location of the corresponding light source based on correlating the position of the dark pixels with the corresponding light source.

16. The method of claim 15, further comprising:

providing, by the controller, a notification of the location of the corresponding light source.

17. A machine comprising:

an engine;

a frame;

a lighting system associated with the machine;

an image capturing device configured to generate an image feed of light cast by the lighting system; and a controller, communicably coupled to the image capturing device, configured to:

receive, from the image capturing device, the image feed of the light cast by the lighting system;

analyze the image feed to detect dial dark pixels that are present in the image feed, the dark pixels being formed by insufficient light cast by the lighting system;

determine if a number of the dark pixels within an area satisfies a threshold based on detecting the dark pixels; and provide an alert if the number of the dark pixels satisfies the threshold.

18. The machine of claim 17, wherein the controller is communicably coupled to an output unit, and wherein the output unit is configured to generate the alert.

19. The machine of claim 17, wherein the dark pixels are detected based on a comparison of each of a plurality of pixels, of the image feed, with a predetermined value.

20. The machine of claim 17, wherein a dark pixel, of the dark pixels, is detected if a light intensity of a corresponding pixel, of the image feed, is less than a particular value.

* * * * *